United States Patent [19]

Roberts et al.

[11] Patent Number: 4,883,749
[45] Date of Patent: Nov. 28, 1989

[54] CHILDREN'S TOILET TRAINING DEVICE WITH DIFFERENTIATING MEANS

[75] Inventors: Freddie R. Roberts; Robert W. Lancette, both of Clarksville, Tenn.

[73] Assignee: Pee Patch, Inc., Clarksville, Tenn.

[21] Appl. No.: 232,448

[22] Filed: Aug. 15, 1988

[51] Int. Cl.⁴ .................. G09B 19/00; E03D 13/00
[52] U.S. Cl. ................................ 434/247; 4/304; 4/623; 4/476
[58] Field of Search .................. 434/247; 4/313, 304, 4/623, 476, 479

[56] References Cited

U.S. PATENT DOCUMENTS

| D. 264,372 | 5/1982 | Sachs . | |
|---|---|---|---|
| 2,075,308 | 3/1937 | Simonsen . | |
| 2,535,704 | 12/1950 | Snyder et al. . | |
| 2,667,802 | 2/1954 | Harris . | |
| 2,699,139 | 1/1955 | Mackey . | |
| 2,766,716 | 10/1956 | Mackey . | |
| 2,788,764 | 4/1957 | Headlee . | |
| 2,802,444 | 8/1957 | Gilmour . | |
| 2,896,567 | 7/1959 | Gilmour . | |
| 3,059,608 | 10/1962 | Lee . | |
| 3,172,390 | 3/1965 | Garthofner . | |
| 3,268,916 | 8/1966 | Hix . | |
| 3,364,478 | 1/1968 | Waard . | |
| 3,670,167 | 6/1972 | Forbes | 4/304 |
| 3,680,151 | 8/1972 | Broadman et al. . | |
| 3,691,980 | 9/1972 | Shastal . | |
| 4,162,490 | 7/1979 | Fu et al. . | |
| 4,174,544 | 9/1979 | Furusawa | 4/476 |
| 4,309,781 | 1/1982 | Lissau | 4/623 |
| 4,667,350 | 5/1987 | Ikenaga et al. | 4/304 |
| 4,707,867 | 9/1987 | Kawabe et al. | 4/313 |
| 4,742,583 | 5/1988 | Yoshida et al. | 4/313 |

FOREIGN PATENT DOCUMENTS

| 3100773 | 11/1981 | Denmark | 4/623 |
|---|---|---|---|
| 360664 | 2/1962 | Switzerland | 4/623 |

Primary Examiner—Edward M. Coven
Assistant Examiner—Valerie Szczepanik
Attorney, Agent, or Firm—Stephen T. Belsheim

[57] ABSTRACT

A toilet training device for rewarding the toilet user when excrement enters or is placed in an excrement container by the toilet user. The toilet training device includes an excrement container having an entrance area and a plurality of infrared light-emitting diodes are sequentially triggered and sequentially emit infrared light substantially intersecting the entrance area. The infrared light is detected at the other end of the entrance area by a infrared light detector that generates an electrical signal in response to detected infrared light. A width pulse counter is connected to the detector and generates a first signal in response to a narrow electrical signal and a second signal in response to a wide electrical signal. The first and second signals are responsive to liquid or solid excrement deposition and generate, through control logic, one of a sight or sound signals or both for rewarding the user of the toilet training device.

32 Claims, 2 Drawing Sheets

U.S. Patent    Nov. 28, 1989    Sheet 1 of 2    4,883,749
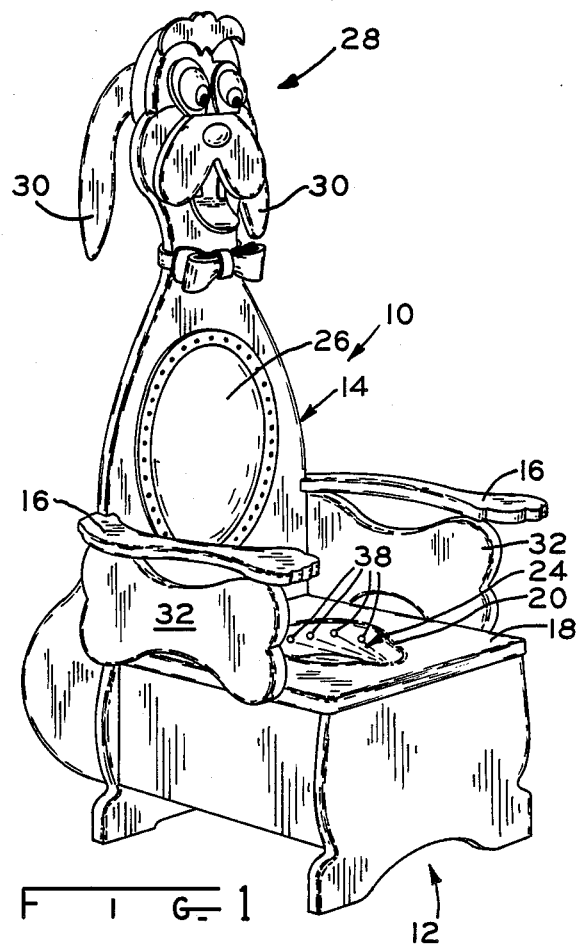
FIG. 1
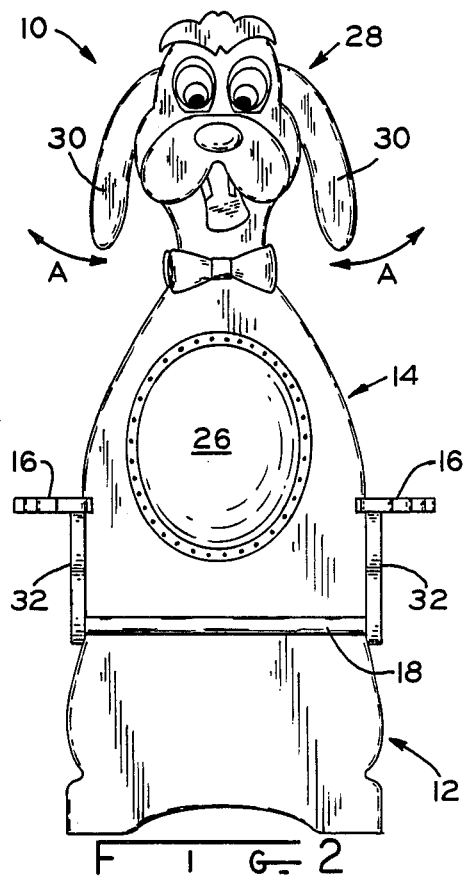
FIG. 2
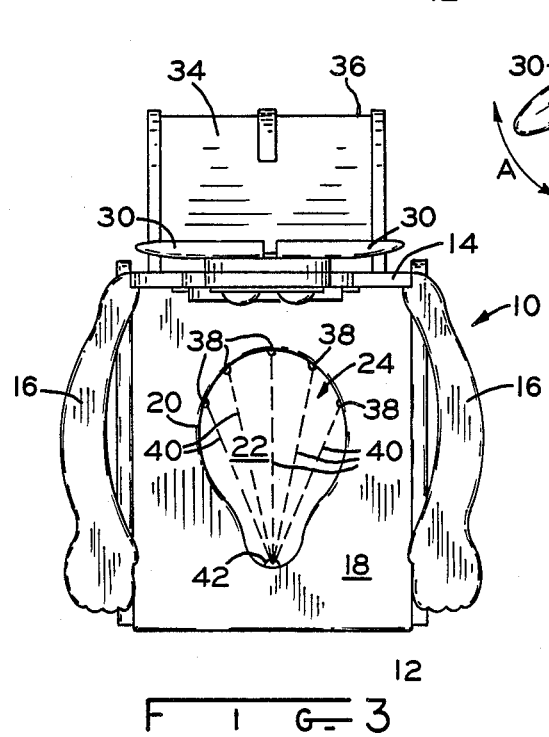
FIG. 3
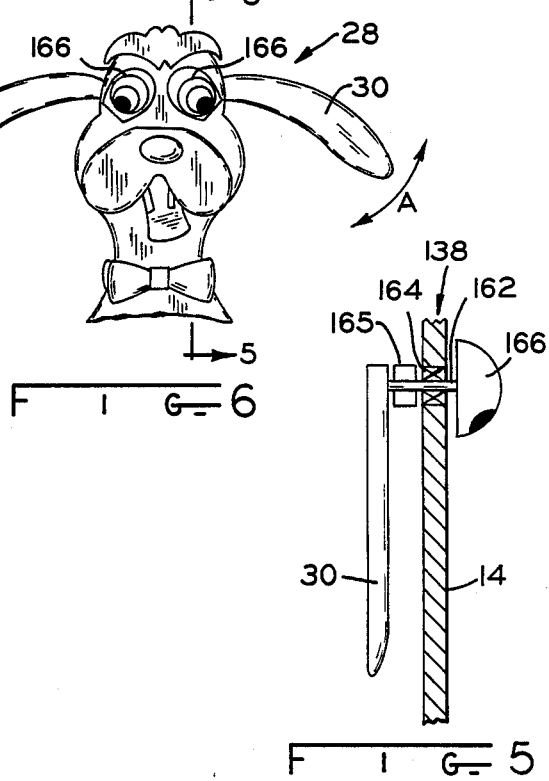
FIG. 6
FIG. 5

CHILDREN'S TOILET TRAINING DEVICE WITH DIFFERENTIATING MEANS

BACKGROUND OF THE INVENTION

This invention relates generally to toilet training devices for training children and/or other animals to use a toilet in a particular fashion and to place waste or excrement in an excrement container. More specifically, this invention relates to a toilet training device that automatically senses when excrement is received in an excrement container and rewards the user of the toilet in response thereto by triggering a reward mechanism such as a sight or sound signal or dispensing device.

In the past, various toilet training devices have been conceived and used for training children to properly use a toilet. This has been done by, for example, playing a jingle or song in response to the child properly placing waste or excrement within an excrement container. Various devices have been employed for determining when the excrement has been placed within the excrement container. Some devices of the past utilize a spring switch mechanism triggered by the weight of the waste received within the excrement container. However, such devices require a substantially accurate spring setting so that the switch may trigger accurately. Further, the spring must be rugged enough to withstand abuse. As can be appreciated, the spring switch setting can be quite difficult to properly set and, over time, the spring switch mechanism can become corroded and inaccurate. Thus, small amounts of waste received within the excrement container may not be sufficient to trigger the switch mechanism and the playing of a song or jingle or the like.

Other toilet training devices, such as U.S. Pat. No. 2,075,308 include an arm extending to the entrance area of the excrement container and the arm is connected to a switch mechanism. As can be appreciated, this type of toilet training device is undesirable because the arm, over time, becomes dirty and unsightly. The arm and switch mechanism connected thereto may also readily become corroded substantially rendering the device unusable. Furthermore, an arm of this character extends only over a portion of the entrance area and if the arm is missed by the waste entering the excrement container, the switch mechanism is not triggered and the jingle or song is never played even though the child properly placed the waste in the excrement container. As can be appreciated, this is undesirable in that the purpose of the toilet training device is not accomplished.

Further yet, the toilet training devices of the past are generally incapable of accurately determining whether urine or a stool has been placed in the excrement container so that a different reward, such as a different song or jingle, can be played in response to urine or in response to a stool being deposited in the excrement container.

Accordingly, there is a need for a toilet training device that is capable of detecting whether urine or a stool has been deposited in the excrement container so that a different reward can be provided in response thereto. Further, the device must be easy to clean and not have mechanisms in the way of the waste that is being deposited so that the problems of cleanliness and corroding mechanisms can be eliminated. The toilet training device must be capable of accurately detecting waste entering the entrance area leading to the excrement container and trigger regardless of the weight of the waste that is deposited so that the user can be rewarded even though a small amount of waste has been deposited. Further yet, the toilet training device must also be capable of detecting waste being deposited in the excrement container regardless of what portion of the entrance area it has been received. That is, the reward mechanism must trigger whenever waste or excrement passes through substantially any portion of the entrance area leading to the excrement container.

SUMMARY OF THE INVENTION

It is the principle object of the present invention to overcome the above-discussed disadvantages and problems associated with the prior toilet training devices and to fill the needs associated therewith.

The present toilet training device solves the problems of past toilet training devices and fills the needs associated therewith by rewarding the toilet user when excrement enters an excrement container. A plurality of light-emitting means emit light that substantially intersects the entrance area leading to the excrement container. The light is detected at the other end of the entrance area by a light-sensing means. The light-sensing means generates an electrical signal in response to the presence or absence of light. By sequentially driving the plurality of light-emitting means and sweeping repeatedly across the entrance area, a narrow or short in time electrical signal generated by the sensing means represents urine being deposited in the excrement container through the entrance area. Further, a wide or longer in time electrical signal generated by the light-sensing means represents a stool being received through the entrance area and into the excrement container. Thereafter, control logic is provided so that different sound signals are generated for urine and stools. Further yet, when both urine and stools are received through the entrance area, the control logic triggers a sight signal of at least one moving part.

In one form thereof, the present invention is directed to a toilet training device having an excrement container that has an entrance area. A light-emitting means is provided for emitting light substantially intersecting the entrance area and a light-sensing means is provided for sensing the light and generating an electrical signal in response thereto. A means for generating a sound or sight signal in response to the electrical signal is provided.

In one form thereof, the present invention is directed to a toilet training device that rewards the toilet user when excrement enters an excrement container. The toilet training device includes an entrance area that leads to the excrement container and a light-emitting means emits light substantially intersecting the entrance area. A light-sensing means is provided for sensing the light and generating an electrical signal in response thereto. The electrical signal triggers a reward mechanism so that the toilet user may be rewarded.

BRIEF DESCRIPTION OF THE DRAWINGS

The above-mentioned and other features and objects of this invention and the manner of obtaining them will become more apparent and the invention itself will be better understood by reference to the following description of an embodiment of the invention, taken in conjunction with the accompanying drawings wherein:

FIG. 1 is a perspective view of a toilet training device seat utilizing the toilet training device according to the present invention;

FIG. 2 is a front elevational view of the toilet training device seat shown in FIG. 1;

FIG. 3 is a top plan view of the toilet training device seat shown in FIG. 2;

FIG. 5 is a cross-sectional view of the toilet training device seat taken along line 5—5 of FIG. 6; and, FIG. 6 is a partial front elevational view of the toilet training device seat shown in FIG. 2 and showing the ears up and eyes skewed.

Figure 4:
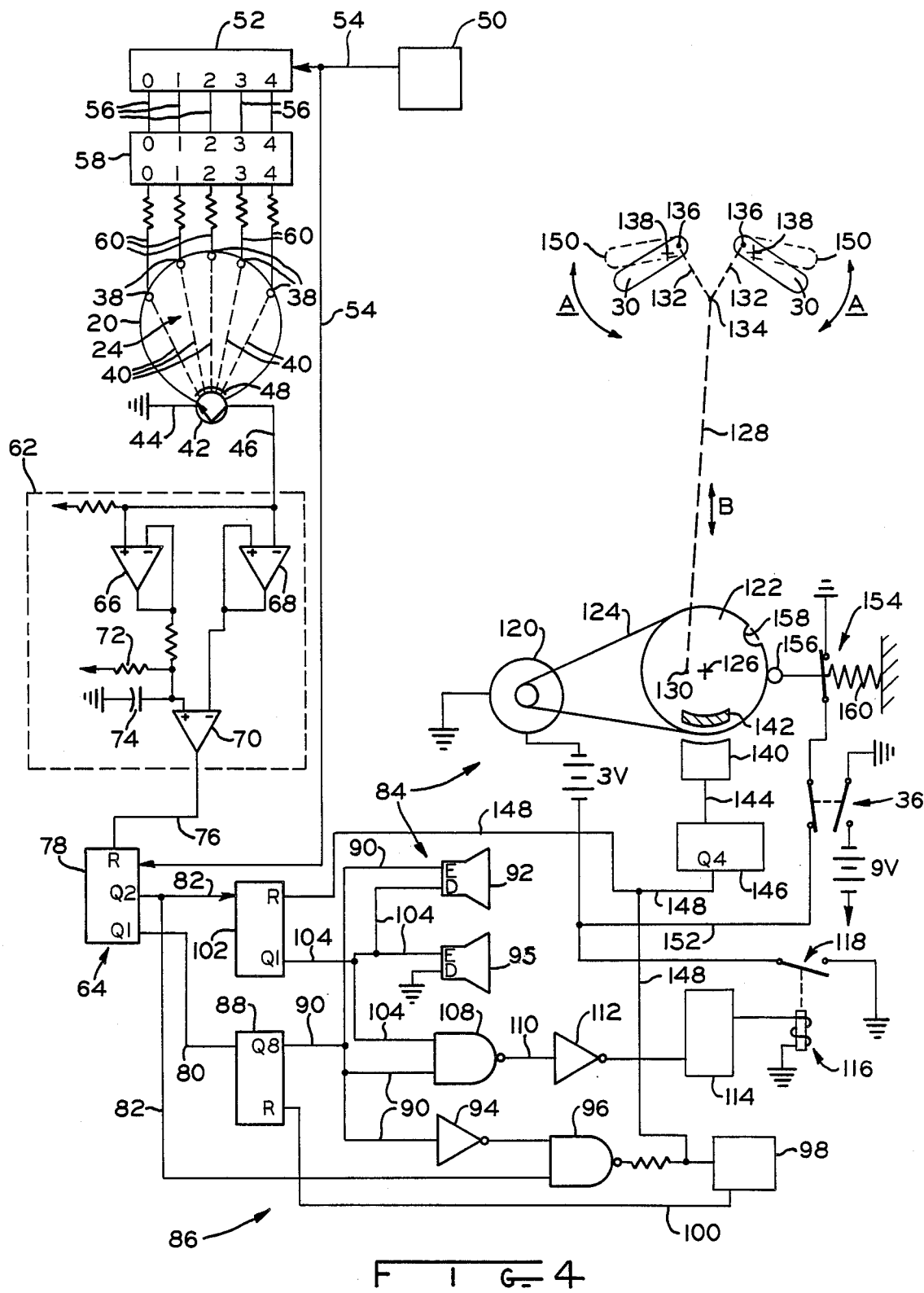
FIG. 4 is a schematic of the toilet training device used in conjunction with the toilet training device seat shown in FIG. 1.

Corresponding reference characters indicate corresponding parts throughout the several views of the drawings. The exemplifications set out herein illustrate a preferred embodiment of the invention in one form thereof and such exemplifications are not to be construed as limiting the scope of the disclosure or the scope of the invention in any manner.

DESCRIPTION OF A SPECIFIC EMBODIMENT

As shown in the drawings, the toilet training device according to the present invention, is adapted to reward the toilet user when excrement or waste enters an excrement container by providing a sound or sight reward signal in response thereto.

As shown in FIGS. 1-3, a children's toilet training device seat is generally indicated as 10 and includes a base 12, back 14 and arm rests 16. A toilet seat 18 rests on base 12 and has a hole 20 leading to an excrement container 22. An entrance area 24 leads from the exterior of the children's toilet training device 10 to the excrement container 22 and provides communication therebetween as shown. In use, a child sits on toilet seat 18 or stands nearby and places excrement in excrement container 22 in a known and customary manner.

The children's toilet training device 10, as shown in FIGS. 1-3, is adapted to be user friendly in appearance and, thus, back 14 includes a padded portion 26 and a puppy face sculptured upper portion 28. The ears 30 are adapted to move as indicated by arrows A, as more fully described hereinbelow. As shown, arm rests 16 are shaped like paws and are supported by bone-shaped portions 32. Toilet paper is housed behind back 14 and below toilet paper door 34. The main power on/off switch 36 is located behind back 14 and below door 34 for easy access thereto.

A light-emitting means for emitting light substantially intersecting entrance area 24 is provided. More specifically, infrared light-emitting diodes 38 are situated substantially on a horizontal plane generally toward the back of entrance area 24 and emit infrared light generally indicated as 40 by dashed lines. Thus, the infrared light emitted by infrared light-emitting diodes 38 substantially forms a plane intersecting entrance area 24 so that excrement entering container 22 causes the blocking of a single or a plurality of infrared light-emitting diodes 38.

The infrared light-emitting diodes 38 are pointed towards and the light emitted therefrom is detected by a light-sensing means that senses the light and generates an electrical signal in response thereto. More specifically, the light-emitting means is an infrared detector 42 grounded at 44 and generating and providing an electrical signal on line 46. A wide angle lens means 48 is provided in front of infrared detector 42 and directs infrared light from the plurality of infrared light-emitting diodes 38 more directly to infrared detector 42.

Infrared light-emitting diodes 38 are caused to emit infrared light sequentially from left to right or right to left through the use of a clock driven sequencer means. More specifically, a clock 50, such as a 555 timer is set and generates a 400 cycle per second clock signal on line 54. A sequencer 52 such as a CMOS 4017 chip receives the clock 400 Hz signal through line 54 and has a sequential output at 0 through 4 to lines 56. Lines 56 are connected to a driver means or a transistor array 58 and driver means 58 is in turn connected to infrared light-emitting diodes 38 through lines 60. Driver means 58 thus receives the output of sequencer 52 and provides the necessary power and drives infrared light-emitting diodes 38 sequentially from 0 to 4 or repeatedly from left to right.

Accordingly, entrance area 24 is continuously swept from left to right by infrared light traveling thereacross sequentially from infrared light-emitting diodes 38 to detector 42. During any given sweep, if any single infrared light-emitting diode is blocked, a high signal is provided by detector 42 at line 46. Furthermore, if a single infrared light-emitting diode 38 is blocked, a narrow or short in time signal is provided at line 46 whereas, if a plurality of infrared light-emitting diodes 38 are blocked, a wide or longer in time signal is provided at line 46. Accordingly, when urine enters excrement container 22 through entrance area 24, generally, a single infrared light-emitting diode 38 will be blocked during any particular sweep and, thus, a narrow signal will be generated in line 46 by detector 42. However, because stools are wider than urine, in general, when stools enter excrement container 22 through entrance area 24, a plurality of infrared light-emitting diodes 38 are blocked and, thus, a wide signal is generated in line 46 by detector 42.

A signal processor means 62 is connected between the sensing means or detector 42 and a pulse width detector means 64 so as to average and prevent stray light that may be detected by infrared detector 42 from generating a detectable signal by pulse width detector means 64. Signal processor 62 includes operational amplifiers 66 and 68, both of which have an input from line 46 as shown on their non-inverting input. The outputs of operational amplifiers 66 and 68 are connected to their respective inverting inputs and, thus, both operational amplifiers 66 and 68 act as unity followers. The outputs of operational amplifiers 66 and 68 are connected to the inputs of comparitor 70. The output of operational amplifier 66 is connected to a 9-volt supply through resistor 72 and to ground through capacitor 74. Thus, the output of operational amplifier 66 is delayed whereas the output of operational amplifier 68 is instantaneous. Accordingly, signal processor means 62 averages the electrical narrow and wide signals received from line 46 and generates a substantially square signal or wave at line 76 and, further, prevents stray light from creating or generating a signal in line 76. The square wave electrical signal in line 76, as can be appreciated, is narrow or wide depending on the input signal received by signal processor means 62 at line 46.

The pulse width detector means, in general, utilizes or detects the narrow and wide electrical signals generated by the infrared detector 42 and signal processor means 62 and generates a first signal in response to a narrow signal and a second signal in response to a wide signal. More specifically, the pulse width detecting means includes a counter 78 having an input from clock 50 through line 54 and being reset via a connection to line 76. Counter 78, thus, counts the pulses received through line 54 for a period determined by the narrow or wide signals received through line 76. When a narrow or short in time signal is received through line 76, counter 78 generates a first signal in line 80 for any given sweep. When a wide or longer in time signal is received through line 76, counter 78 generates a second signal in line 82 for any given sweep.

A generating means generally indicated as 84 is provided for generating one of a sound or sight signals. Further, a control logic means generally indicated as 86, connected between the pulse width detecting means and the generating means, is provided for activating the generating means and generating either a sight or sound signal or both in response to the first and second signals received in lines 80 and 82 respectively. More specifically, counter 88 is connected to line 80 and receives and counts the number of times the first signal is received. Counter 88 is set so as to have an output on line 90 when a first signal is counted eight different times and, representing eight different sweeps. Line 90 is connected to the enabling input of a sound generating means or synthesizer 92. Synthesizer 92 generates a sound signal when enabled via line 90 and represents urine entering excrement container 22 via entrance area 24. As can be appreciated, counter 88 aids in detecting when only urine is traveling through entrance area 24 and blocking only one of infrared light-emitting diodes 38 so that only in that situation synthesizer 92 may be enabled.

Line 90 is also connected to invertor 94 which, in turn, is connected to NAND gate 96. NAND gate 96 is connected to monostable clock 98 and which has an output on line 100 connected to the reset of counter 88. The other input to NAND gate 96 is connected to line 82 as shown. Through invertor 94, NAND gate 96 and monostable clock 98, the urine reward mechanism or urine synthesizer 92 is prevented from being activated when, in fact, urine has not been received in excrement container 22. For example, where a number of narrow-tipped stools pass through entrance area 24 to excrement container 22, it is possible for a plurality of first signals to be received in line 80 and causing counter 88 to count. In this regard, so as to cancel these falsely generated first signals, whenever a second signal is received on line 82 and line 90 is not activated or high, NAND gate 96 causes monostable clock 98 to have an output on line 100 for approximately 0.5 seconds and reset counter 88 for that period of time. Accordingly, where a number of narrow-tipped stools are received through entrance area 24 prior to urine being received and detected, counter 88 is reset for approximately 0.5 seconds, through line 100, through monostable clock 98 and through NAND gate 96 which is activated by the concurrent presence of a signal on line 82 and the absence of a set condition or signal on line 90 and invertor 94 from narrow pulse counter 88.

Another counter 102 is provided and is connected to line 82 and, thus, receives and counts the second signal. Counter 102 is set so as to have an output on line 104 whenever a second signal is received and counted via line 82. It should be noted that as in the case of counter 88, counter 102 may be connected to line 104 at an output whereat more than one second signal must be received via line 82 and counted so as to have an output on line 104. Line 104 is connected to the enabling input of sound-emitting means or synthesizer 95. Line 104 is also connected to the disabling input of synthesizer 92 and, thus, an output on line 104 prevents synthesizer 92 from emitting a sound signal. Synthesizer 95 generates or emits a sound signal representative of a stool being deposited in the excrement container 22 through entrance area 24. In essence, as described hereinabove, a stool blocks a plurality of infrared light-emitting diodes 38 causing a wide signal on line 76 and causing counter 78 to have an output of a second signal on line 82 and causing counter 102 to enable synthesizer 95.

Line 104 and line 90 are connected as inputs to NAND gate 108 so that when both lines 90 and 104 are high or have a signal generated thereon, NAND gate 108 generates an output on line 110 connected to invertor 112. Invertor 112 is connected to transistor array 114 that, in turn, powers solenoid 116 connected to normally open switch 118. Accordingly, when a signal is received on both lines 90 and 104, solenoid 116 is energized and switch 118 is closed.

The sight signal means that consists of at least one moving part is now described hereinbelow. More specifically, an electric motor 120 drives pulley or disk 122 via belt 124. Pulley 122 pivots about pivot axis 126. A vertical member 128, shown as a dashed line, is pivotally connected at 130 to pulley 122 radially away from pivot axis 126 so that rotational movement of pulley 122 causes vertical member 128 to move vertically upwardly and downwardly as indicated by arrows B. Vertical member 128 is pivotally connected to arms 132 at 134 and arms 132 are pivotally connected to ears 30 at 136. Ears 30 are also pivotally connected at 138 to a stable non-moving portion of the toilet training device such as back 14. Thus, vertical upward and downward movement of member 128 causes arms 132 to also move upwardly and downwardly and, thus, arms 132 cause ears 30 to pivot about the pivotal connections 138 as indicated by arrows A. It should be noted that the sight signal means can also be a light-emitting source such as an electrical light-emitting bulb or means.

As shown in FIG. 5, ears 30 are connected to shaft 162 that extends through bearing 164 located in back portion 14. A washer member 165 is located between ears 30 and back 14. Shaft 162 is further connected to eyes 166 and, thus, rotational movement of shaft 162 causes both ears 30 and eyes 166 to pivot. As described hereinabove, the vertical upward and downward movement of member 128 ultimately not only causes ears 30 to pivot about the pivotal connections 138 but also causes the eyes 166 to pivot between the positions shown in FIGS. 2 and 6. Furthermore, it is intended that when the ears are in the down position as shown in FIG. 2, the eyes appear to be concentrating on container 22 and when the ears are in the up position as shown in FIG. 6, the eyes are askew so that the puppy face 28 appears excited or overwhelmed as shown in FIG. 6.

Motor 120 is powered by a three-volt direct current electrical supply that is in series with switch 118. Accordingly, the activation of solenoid 116 and closing of switch 118 causes motor 120 to be energized thereby also causing rotational movement of pulley 122 and movement of ears 30 as described hereinabove.

A hall sensor 140 is provided so that when a magnet 142 passes thereover, a signal is generated on line 144 connected to counter 146. Counter 146 is set so that when a predetermined number of signals are received via line 144, an output reset signal is generated on line 148. Line 148 is connected to the reset of counter 102 and the input of monostable clock 98 and, thus, a signal received on line 148 causes both counters 88 and 92 to be reset.

In operation, when an output is received on both lines 90 and 104, representing both urine and a stool being received through the entrance area 24, switch 118 is closed causing motor 120 to be energized and the ears 30 to move as indicated by arrows A. Thereafter, when pulley 122 has rotated a predetermined number of times and a signal generated by hall sensor 140 is counted by counter 146 a predetermined number of times, a reset signal is placed on line 148 and counters 102 and 88 are reset causing solenoid 116 to be deactivated, switch 118 to be opened, motor 120 to be deenergized, and ears 30 stopped from further pivotal movement.

A main on/off switch 36 is provided and is of the double-pole double-throw type. Switch 36 is shown in the off position. In this position, the 9-volt direct current electrical supply that normally provides current to the electrical components described hereinabove is disabled and not connected thereto. Accordingly, all the above-described electrical components, except for motor 120, as will be described hereinbelow, are not operational when main switch 36 is in the off position as shown.

It should be noted that whenever switch 118 is closed causing ears 30 to wiggle as indicated by arrows A, hall sensor 140 and magnet 142 are situated so that the last signal received on line 144 causing the resetting of counters 88 and 102 and the opening of switch 118 is generated when the ears are in their up position as indicated by dashed lines 150. This is so that whenever both urine and a stool are received within the excrement container and causing ears 32 to wiggle, the ears are left in an up position as indicated by dashed lines 150 so that the parent may know and have a visual indication that waste has been deposited in the excrement container 22.

Ears 30 are reset to their original position by placing main switch 36 in the off position as shown in FIG. 4. In this position, motor 120 is energized and current is provided thereto from the three volt supply via parallel line 152 connected to the closed portion of switch 36 and which is connected via switch 154 to ground. Switch 154 is normally closed as shown and is connected to cam roller 156. Cam roller 156 is adapted to be received within recess 158 and spring 160 is situated so as to push cam roller 156 within recess 158 and opening switch 154 whenever roller 156 and recess 158 are aligned. Further, cam roller 156 and recess 158 are positioned with respect to one another so that when cam roller 156 is within recess 158, ears 30 are in their downwardly pointing position as shown in solid lines in FIG. 4. Thus, in operation, after the ears 30 have been wiggled as described hereinabove and remain in the up position as shown by dashed lines 150 and the parent causes switch 36 to be placed in the off position as shown, motor 120 is energized causing pulley 122 to be rotated until cam roller 156 is pushed within recess 158 and switch 154 is open. Thus, with switch 154 in the open position and the ears down as described hereinabove, the toilet training device is again ready to be turned on and used again. In this regard, when switch 36 is placed in the on position, the electrical components are powered via the 9-volt direct current supply and, simultaneously, line 152 leading to switch 154 is disconnected therefrom. In this position, only the closing of switch 118 causes motor 120 to be energized and ears 30 to be wiggled.

As can be appreciated and as described hereinabove, the toilet training device rewards the toilet user when excrement, either urine or a stool or both, enters the excrement container 22. When either urine or a stool are detected, a reward mechanism is triggered and the toilet user is rewarded accordingly. The reward mechanism can be any one of many such as a sound signal or a sight signal. In the preferred embodiment, as described hereinabove, synthesizer 92 provides a sound signal when urine is received in excrement container 22. Further, synthesizer 95 provides a sound signal whenever a stool is received within excrement container 22. Further yet, a sight signal of ears 30 wiggling and eyes 166 turning is provided when both urine and a stool are received within excrement container 22. It should be noted, however, that other reward mechanisms can be triggered. For example, if the toilet training device 10 is used to train an animal such as a dog to properly place waste in the excrement container 22, the reward mechanism can be a dispensing device whereby a treat is dispensed in response to the placement of waste in the excrement container 22.

Finally, it should be noted that the infrared light-emitting diodes 38 are grounded in a known and customary fashion and that the various components of the toilet training device, such as the counters, clock, etc., are provided with power and connected to ground in a known and customary fashion, although not specifically shown in the drawings herein.

While the invention has been described as having a specific embodiment, it will be understood that it is capable of further modifications. This application is therefore intended to cover any variations, uses or adaptations of the invention following the general principles thereof and including such departures from the present disclosure as come within known or customary practice in the art to which this invention pertains and fall within the limits of the appended claims.

What is claimed is:

1. A toilet training device for differentiating the deposition of solid or liquid excrement therein and generating a corresponding signal, the device comprising:
   an excrement container having an entrance area;
   a light-emitting means for emitting light substantially intersecting said entrance area;
   a light-sensing means for sensing said light and generating an electrical signal in response thereto, said electrical signals including a first electrical signal generated in response to the deposition of liquid excrement and a second electrical signal generated in response to the deposition of solid excrement; and,
   means for generating one of a sound or sight signal in response to said electrical signal.

2. The toilet training device of claim 1 wherein said light-emitting means includes a plurality of infrared light-emitting means for emitting infrared light and said sensing means includes an infrared detector for sensing infrared light emitted by said infrared light-emitting means and generating an electrical signal in response thereto.

3. The toilet training device of claim 2 further comprising wide angle lens means for directing infrared light from said plurality of infrared light-emitting means to said infrared detector.

4. The toilet training device of claim 2 further comprising sequencer means connected to said plurality of infrared light-emitting means for causing said infrared light-emitting means to sequentially emit infrared light.

5. The toilet training device of claim 1 comprising a plurality of light-emitting means.

6. The toilet training device of claim 5 further comprising wide angle lens means for directing light from said plurality of light-emitting means to said light-sensing means.

7. The toilet training device of claim 6 further comprising sequencer means connected to said plurality of light-emitting means for causing said light-emitting means to sequentially emit light.

8. The toilet training device of claim 1 wherein said sight signal comprises at least one moving part.

9. A toilet training device for selectively rewarding the toilet user depending on whether liquid excrement, solid excrement or liquid and solid excrement are deposited in the device, said deceive comprising:
an excrement container;
an entrance area leading to the excrement container;
light-emitting means for emitting light substantially intersecting said entrance area;
light-sensing means for sensing said light and generating an electrical signal in response thereto whereby said electrical signal is representative of one of three conditions wherein a first condition comprises the deposition of liquid excrement into the excrement container, a second condition comprises the deposition of solid excrement into the container, and a third condition comprises the deposition of solid and liquid excrement into the excrement container; a reward mechanism triggered by said electrical signal whereby the toilet user is rewarded in one of three ways depending upon the condition.

10. The toilet training device of claim 9 wherein said reward mechanism includes means for generating one of a sound or sight signal in response to said electrical signal.

11. The toilet training device of claim 10 wherein said sight signal comprises at least one moving part.

12. The toilet training device of claim 9 comprising a plurality of light-emitting means.

13. The toilet training device of claim 12 further comprising wide angle lens means for directing light from said plurality of light-emitting means to said light-sensing means.

14. The toilet training device of claim 12 wherein said light-emitting means emits infrared light and said light-sensing means senses infrared light and generates an electrical signal in response thereto.

15. The toilet training device of claim 12 further comprising sequencer means connected to said plurality of light-emitting means for causing said light-emitting means to sequentially emit light.

16. The toilet training device of claim 9 wherein said light-emitting means emits infrared light and said light-sensing means senses said infrared light and generates an electrical signal in response thereto.

17. A toilet training device comprising:
an excrement container having an entrance area;
light-emitting means for emitting light substantially intersecting said entrance area;
light-sensing means for sensing said light and generating an electrical signal in response thereto;
means for generating one of a sound or sight signal in response to said electrical signal;
said light-emitting means includes a plurality of infrared light-emitting means for emitting infrared light and said sensing means includes an infrared detector for sensing infrared light emitted by said infrared light-emitting means and generating an electrical signal in response thereto;
a sequencer means connected to said plurality of infrared light emitting means for causing said infrared light-emitting means to sequentially emit infrared light; and
a pulse width detecting means connected between said sensing means and said generating means for detecting narrow and wide electrical signals generated by said infrared sensing means and for generating a first signal in response to a narrow signal and a second signal in response to a wide signal.

18. The toilet training device of claim 17 further comprising signal processor means connected between said sensing means and said pulse width detector means for preventing stray light detected by said sensing means from generating said electrical narrow or wide signals.

19. The toilet training device of claim 17 further comprising control logic means connected between said pulse width detecting means and said generating means for activating said generating means and generating either a sight or sound signal or both in response to said first and second signals.

20. The toilet training device of claim 19 wherein said sight signal comprises at least one moving part.

21. The toilet training device of claim 19 further comprising signal processor means connected between said sensing means and said pulse width detector means for preventing stray light detected by said sensing means from generating said electrical narrow or wide signals.

22. A toilet training device comprising:
an excrement container having an entrance area;
light-emitting means for emitting light substantially intersecting said entrance area;
light-sensing means for sensing said light and generating an electrical signal in response thereto;
means for generating one of a sound or sight signal in response to said electrical signal;
a plurality of light-emitting means;
a wide angle lens means for directing light from said plurality of light-emitting means to said light-sensing means;
a sequencer means connected to said plurality of light-emitting means for causing said light-emitting means to sequentially emit light; and
a pulse width detecting means connected between said light-sensing means and said generating means for detecting narrow and wide electrical signals generated by said sensing means and for generating a first signal in response to a narrow signal and a second signal in response to a wide signal.

23. The toilet training device of claim 22 further comprising signal processor means connected between said light-sensing means and said pulse width detector means for preventing stray light detected by said light-sensing means from generating said electrical, narrow or wide signals.

24. The toilet training device of claim 22 further comprising control logic means connected between said pulse width detecting means and said generating means for activating said generating means and generating either a sight or sound signal or both in response to said first and second signals.

25. The toilet training device of claim 24 wherein said sight signal comprises at least one moving part.

26. The toilet training device of claim 24 further comprising signal processor means connected between said light-sensing means and said pulse width detector means for preventing stray light detected by said light-sensing means from generating said electrical, narrow or wide signals.

27. A toilet training device for rewarding the toilet user when excrement enters an excrement container, said device comprising:
an entrance area leading to the excrement container;
light-emitting means for emitting light substantially intersecting said entrance area;
light-sensing means for sensing said light and generating an electrical signal in response thereto; a reward mechanism triggered by said electrical signal whereby the toilet user is rewarded;
a plurality of light-emitting means;
a sequencer means connected to said plurality of light-emitting means for causing said light-emitting means to sequentially emit light; and
a pulse width detecting means connected between said light-sensing means and said reward mechanism for detecting narrow and wide electrical signals generated by said sensing means and for generating a first signal in response to a narrow signal and a second signal in response to a wide signal.

28. The toilet training device of claim 27 further comprising signal processor means connected between said light-sensing means and said pulse width detector means for preventing stray light detected by said light-sensing means from generating said electrical, narrow or wide signals.

29. The toilet training device of claim 27 further comprising control logic means connected between said pulse width detecting means and said reward mechanism for activating a generating means for generating either a sight or sound signal or both in response to said first and second signals.

30. The toilet training device of claim 29 wherein said sight signal comprises at least one moving part.

31. The toilet training device of claim 29 further comprising signal processor means connected between said light-sensing means and said pulse width detector means for preventing stray light detected by said light-sensing means from generating said electrical, narrow or wide signals.

32. The toilet training device of claim 31 wherein said light-emitting means emits infrared light and said light-sensing means senses said infrared light and generates an electrical signal in response thereto.

* * * * *